United States Patent [19]

Spilo et al.

[11] Patent Number: 6,134,601
[45] Date of Patent: Oct. 17, 2000

[54] COMPUTER RESOURCE MANAGEMENT SYSTEM

[75] Inventors: Michael L. Spilo; Jonathan A. Daub, both of New York, N.Y.

[73] Assignee: Networks Associates, Inc., Santa Clara, Calif.

[21] Appl. No.: 08/664,508

[22] Filed: Jun. 17, 1996

[51] Int. Cl.[7] .................................................. G06F 9/00
[52] U.S. Cl. ............................................................ 709/328
[58] Field of Search .................................... 395/680, 682; 711/170–173, 206–209; 709/300, 302, 328

[56] References Cited

U.S. PATENT DOCUMENTS

| | | | |
|---|---|---|---|
| 5,167,030 | 11/1992 | Spilo ....................................... | 709/221 |
| 5,189,733 | 2/1993 | Bennett et al. .......................... | 711/170 |
| 5,269,013 | 12/1993 | Abramson et al. ...................... | 711/170 |
| 5,293,599 | 3/1994 | Kagimasa et al. ...................... | 711/159 |
| 5,371,871 | 12/1994 | Spilo ....................................... | 711/154 |
| 5,408,650 | 4/1995 | Arsenault ................................. | 717/4 |
| 5,410,651 | 4/1995 | Sekizawa et al. ....................... | 709/224 |
| 5,428,757 | 6/1995 | Sutton ..................................... | 709/107 |
| 5,428,779 | 6/1995 | Allegrucci et al. ..................... | 709/108 |
| 5,430,874 | 7/1995 | Kumazaki et al. ..................... | 709/103 |
| 5,432,908 | 7/1995 | Heddes et al. .......................... | 711/147 |
| 5,448,735 | 9/1995 | Anderson et al. ...................... | 709/100 |
| 5,459,864 | 10/1995 | Brent et al. ............................. | 709/105 |
| 5,537,548 | 7/1996 | Fin et al. ................................. | 709/204 |
| 5,561,788 | 10/1996 | Letwin ..................................... | 703/22 |
| 5,764,985 | 6/1998 | Smale ..................................... | 395/682 |
| 5,918,004 | 6/1999 | Anderson et al. ...................... | 395/183.14 |

OTHER PUBLICATIONS

D. Klausner, "The Resource Management module in Soft-RAM 3.0 (beta) B–1—A White Paper and Review", Syncronys Online!, document dated Aug. 28, 1996.

"Syncronys Softcorp Issues SoftRAM96 Technology Progress Report", Syncronys Online!, news release dated May 31, 1996.

"SoftRAM 3.0 Beta–11 White Paper", Syncronys Online!, undated document.

Pietrek, Matt, "Learn System–Level Win32 Coding Techniques by Writing an API Spy Program," Microsoft Systems Journal, pp(49), Dec. 1994.

*Primary Examiner*—Majid Banankhah
*Assistant Examiner*—St. John Courtenay, III
*Attorney, Agent, or Firm*—Darby & Darby

[57] ABSTRACT

A system and method for managing scarce computer system memory resources has three aspects. A first aspect allows large data structures to be replaced by a pointer that causes an intentional fault to occur. The fault is trapped, and the invention interposes the required data. A second aspect associates data structures with both the task and the module that own the structure. The structure can be eliminated from memory when both the owning task and the owning module have terminated. A third aspect utilizes swapping techniques to maintain multiple local data areas for multiple tasks. In conjunction, the three aspects of the invention provide improved resource availability and substantially unimpaired system performance

9 Claims, 11 Drawing Sheets

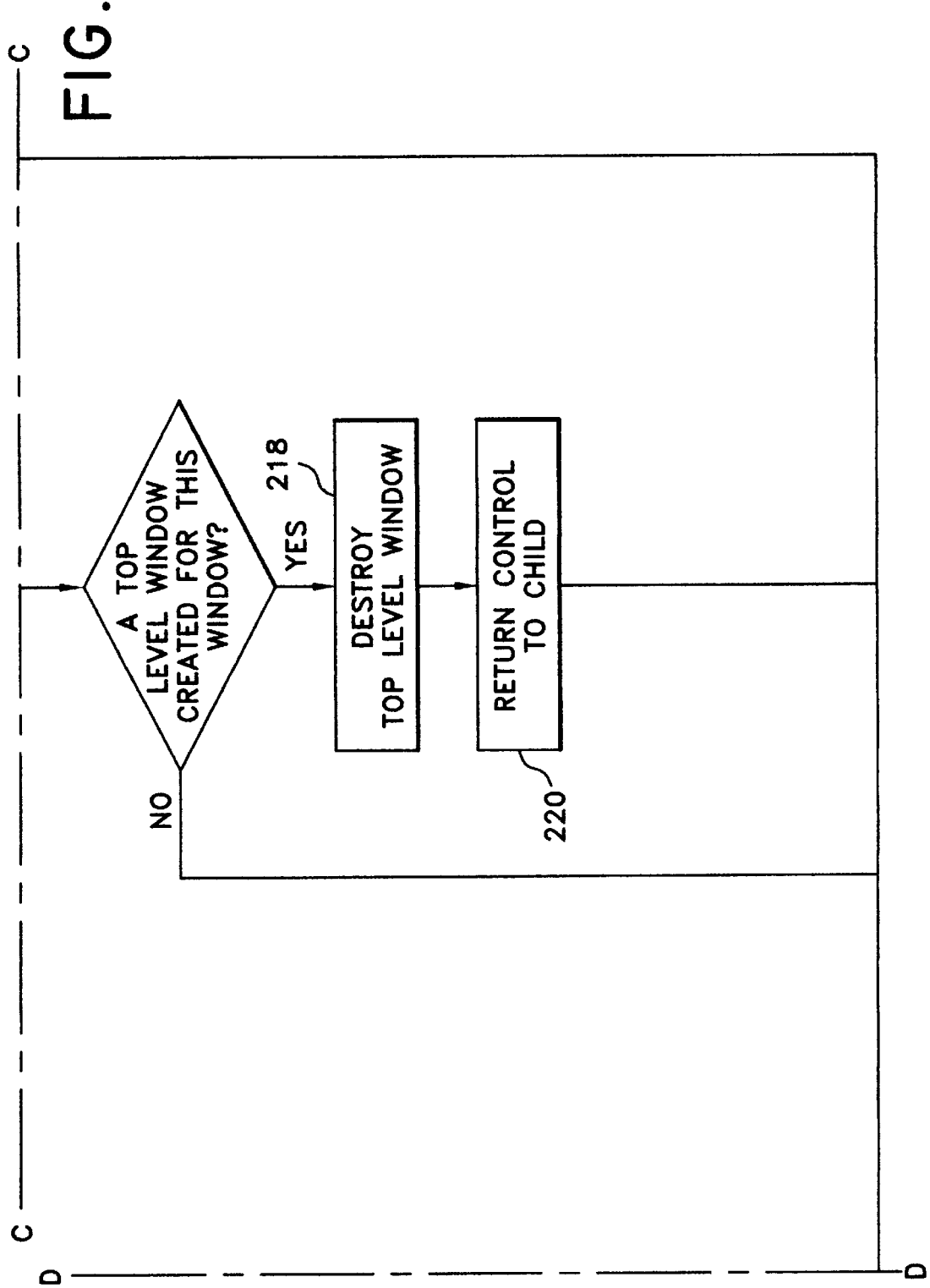

COMPUTER RESOURCE MANAGEMENT SYSTEM

This invention relates to a system and method for managing computer resources in cooperation with an operating system, and more specifically to a system and method capable of reducing limitations on resources, particularly certain GDI and USER resources, under Microsoft Windows.

BACKGROUND OF THE INVENTION

Computers, including personal computers, perform their functions by processing instructions, in the form of binary numbers, which can be interpreted by the central processing unit (CPU) of the machine. Programs written in assembly language use these instructions in a form that is easier for programmers to work with than binary numbers, and the resulting code is "assembled" into machine language for use by the computer. Programs written in higher level languages are "compiled" into machine language, and in this way, many different programs written in different languages can run on one machine. It was recognized early in the development of computer technology that many programs would require or could benefit from a common set of services, such as routines for handling input and output, managing files, interfacing with the user, and in some circumstances, multitasking two or more programs. These and other services are commonly provided by an operating system (e.g. DOS) or an operating environment acting in cooperation with an operating system. An important function of an operating system or environment is to manage resources available to or in use by programs running on the computer. In this context, a resource is any data object allocated to or from a limited memory space designated for use by the operating system or environment.

The Microsoft Windows® operating environment has a history of greater than ten years. It was originally designed to run on the Intel 8088 and 80286 microprocessors, both of which are 16-bit microprocessors. By way of background, the largest number representable with 16 binary bits is 65,536, and hence the largest amount of memory that is directly addressable at one time by a 16 bit operand is 64K (64×1024, or 65,536). As a consequence of the design of the processors, although more memory is available to these microprocessors through a segment-mapping concept, all system memory used in a computer utilizing an 8088 or 80286 microprocessor is divided into 64K chunks known as segments.

Although version 3 of Microsoft Windows® is optimized to use certain features of the Intel 80386 microprocessor (and later processors), if available, the original memory scheme was carried over, largely for compatibility reasons. Other processing and addressing modes are also available in these newer processors, most notably protected mode, which can handle 16 and 32 bit programs, and permits direct addressing of up to 4 GB of memory. In the version 3 releases of Windows, the primary modules of the operating environment continue to be 16-bit programs, although the 80386, 80486, and Pentium processors can accommodate 32-bit programs.

The three primary modules of Windows® 3.1 are KERNEL, which provides the lowest level of services to application programs; USER, which implements the windowed multitasking user interface; and GDI (Graphics Device Interface), which implements a device-independent methodology for displaying graphics on a screen or printer.

The USER module maintains its data in four 64K segments: the Window segment, the Menu segment, the Menu Atom (or Menu String) segment, and the Global Atom (or USER Atom) segment. The Window segment contains a variety of data defining window classes and characteristics. The Window segment is also the default data segment for the USER module, and as a result tends to contain a wide assortment of data. When the USER module requires temporary data space to perform an operation, it frequently allocates such space out of the Window segment. The Menu and Menu Atom segments are reserved specifically to hold data pertaining to drop-down menus, which are maintained by USER on behalf of the application programs that use them. The Global Atom segment exclusively contains alpha-numeric strings registered by applications; it rarely contributes to resource shortages.

The GDI module maintains its data in two 64K segments: the GDI Object segment and the GDI Atom segment. The GDI Object segment contains information on pens, brushes, fonts, device contexts, and other items contained in data structures which can frequently be relatively large. The GDI Atom segment contains only font names; since it holds only a small amount of information, it rarely contributes to Windows® resource shortages.

While the amount of available physical memory on computers running Windows® has increased dramatically over the years, from 2M or 4M several years ago to 16M and higher today, and the sophistication of Windows® applications has also increased, the size of the data areas maintained by USER and GDI has remained constant. Thus, as systems have been experiencing higher and higher demand for resources, the availability of resources has begun to become more and more scarce.

The resource shortage problem has been recognized and solutions have been proposed. The product WinProbe by Quarterdeck (1994) attempts to solve the problem of GDI "resource leaks." WinProbe includes a component that tracks the task ownership of any GDI resources allocated by application programs. For this purpose it adds several bytes to the size of each such resource. Upon the user's direction or at a settable interval, WinProbe will attempt to clean up any resources that exist for tasks that are no longer running. This releases unused resources, but has several serious drawbacks. By increasing the size of each resource, WinProbe tends to aggravate resource shortages in one way while attempting to mitigate them in another way. Furthermore, resources cannot always safely or accurately be associated with the task context in which they were allocated. In Windows® 3.1, a library unassociated with the running task may allocate GDI resources; in such a case, it would be inappropriate and potentially unstable to free the resources at the time the task exits. Moreover certain resources may be allocated by a task and then placed into the system clipboard; these clipboard resources are required to remain allocated after the task has exited and it would be improper to free them. Finally, WinProbe requires user intervention or an elapsed time period before cleaning up unused resources.

Another prior art method for reducing GDI resource use is performed by the AnyView Professional product (Binar Graphics, 1994). AnyView relocates a certain class of object that GDI normally allocates in its own object segment into AnyView's own private memory. However, the objects that AnyView can deal with in this way are limited to objects for which GDI is custodian but does not need to access directly. This class includes primarily device-brush objects that are created by the display driver in memory allocated by GDI in the GDI Object segment and used only by the display driver. This solution does not sufficiently reduce resource load by itself.

The AnyView program also attempts to resolve resource scarcity by maintaining one of the system resource segments on a per-process basis. AnyView recognizes that the contents of the USER Menu segment represents a limited variety of data pertaining exclusively to drop-down menus, and that such data is primarily useful to the process that caused it to be created. Therefore, AnyView creates for each running application a separate copy of the USER Menu segment; the appropriate segment is activated whenever a different application is executed. AnyView's methodology is effective, but only for the USER Menu segment. It cannot be applied to the USER Window segment because that segment contains a large amount of data that cannot be associated with a single process; that data is required by USER to implement the windowing system. Moreover, though menus are typically accessed solely by their owning applications, they must be visible to other applications. This is mandated by specifications in the Microsoft Windows® Software Development Kit (SDK). Certain system libraries such as Object Linking and Embedding (OLE) rely on this property. Furthermore, an application may comprise multiple processes sharing a common user interface. These latter cases are not addressed by AnyView.

Another potential solution to the recognized limitations of 64K segment sizes can be implemented by relocating resource objects into 32-bit memory regions unconstrained by the 64K limit. This approach is realized by Microsoft Windows® 95, and was implemented in the "beta" releases of that product. However, this approach requires a significant rewrite of the USER and GDI modules, involving the modification of a great deal of original source code for Windows. Consequently, the approach is not feasible for a third-party improvement to the performance of an existing product, e.g., Windows® 3.1.

Windows® 95, including the beta releases, also associates GDI resources with the owning task. However, because of the possibility stated above that a resource was allocated by a library unassociated with the running task, Windows® 95 does not delete any unused GDI resources until no 16-bit applications are running. New 32-bit applications, written expressly for Windows® 95, do not have this limitation.

As shown above, the known methods for managing limited system resources have proven to be deficient in a number of ways. The invention addresses these deficiencies and improves resource management, particularly in cooperation with Microsoft Windows®.

SUMMARY OF THE INVENTION

This invention is directed to alleviating resource shortages in a multitasking environment and in particular is directed to the USER Window segment and the GDI Object segment of Windows®. Resource shortages in those two segments have been found to be severe enough to warrant intervention, and the techniques of the prior art have been found to be insufficient, as discussed above.

To accomplish the foregoing, the invention has three aspects. First, GDI objects can be relocated out of the operating environment's 64K GDI object segment to preserve the availability of space within the segment. The GDI objects are moved back into the segment when necessary for access by a program. Second, GDI objects are tracked and associated with the task and module that owns them. If the task and module terminate without properly releasing the objects they allocated, the invention will release the space. Third, objects in the USER Window segment are partitioned into two categories, global and local. Global objects are retained in the segment, but local objects are allocated to a particular task or task group and swapped out when another task is running. The swapping operation is also available for the USER Menu and Menu Atom segments. Accordingly, by way of the invention, space in the GDI Object segment and the USER Window segment is used more effectively with little significant performance degradation below a threshold level of resource exhaustion. Above the threshold, where Windows® would ordinarily begin to run out of resources, the invention will ensure that sufficient resources are available.

BRIEF DESCRIPTION OF THE DRAWINGS

FIGS. 8A–8D show a flow chart illustrating the steps performed according to an exemplary embodiment of the invention, in which the resources of two or more processes are grouped together.

DESCRIPTION OF THE PREFERRED EMBODIMENT

A detailed illustrative embodiment of the invention is disclosed herein. However, a method for managing system resources in accordance with the invention may be embodied in a wide variety of forms, apparent to the person of ordinary skill in the art, some of which may be different from those of the disclosed embodiment. Consequently, the specific structural and functional details disclosed here are representative, provide a preferred embodiment of the invention, and do not limit the scope of the invention.

At the outset, it should be noted that references to Microsoft Windows® version 3.1 are deemed to refer also to Windows® version 3.11, Windows® for Workgroups version 3.1, Windows® for Workgroups version 3.11, Windows® 95, and all other versions of Windows® having the described attributes.

GDI Object Resources

Figure 1:
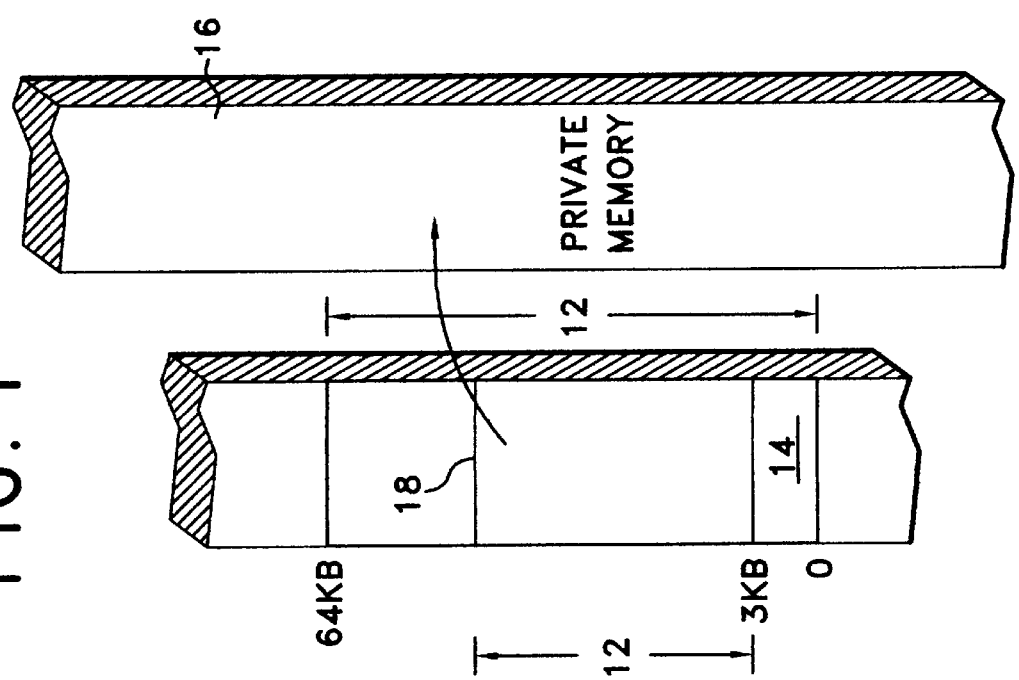
FIG. 1 is a diagram illustrating data structures and operations utilized in a first aspect of the invention regarding the relocation of GDI Object resources.

FIG. 1 illustrates the allocation of resources in a GDI Object segment 10 on a computer system running Windows® 3.1. The GDI Object segment 10 is contained entirely within a single 64K segment, which is a limitation imposed by the architecture of Windows® 3.1. Specifically, the GDI Object segment contains a local heap 12 contained within a global data object. The first approximately 3K of the GDI Object segment 10 contains static data 14, with which the invention is not concerned. The remaining approximately 61K of the segment, the local heap 12, is available for storage of GDI objects. Only a small portion of the segment is allocated at first; the limit is increased as a larger number of resources becomes necessary. As discussed in detail below, the invention allows for the use of most of the remaining 61K without any significant performance overhead. The invention provides that GDI objects are swapped to a separate memory space 16 when the growth of the segment approaches a threshold.

GDI objects, or resources, are allocated starting at the bottom of the GDI Object local heap 12. There is a segment limit 18 denoting the end of the segment 10. GDI objects can be created and destroyed by the GDI at the request of application programs or the USER module. If, when the GDI module attempts to create an object, there is insufficient room, the GDI object segment will be re-allocated larger and the segment limit 18 will be moved to increase the size of the segment 10 (up to the 64K ceiling). However, it is possible that room exists below the segment limit 18 due to previously destroyed GDI resources. If the segment limit 18 is at the 64K ceiling, and insufficient space exists below the segment limit, the GDI will not be able to create the requested resource and the application (or Windows® itself) will fail.

As noted above, the segment limit 18 is established so that the effective size of the GDI Object segment 10 is small at first, but can be expanded to the end of the 64K segment. Two types of objects are theoretically possible in the segment, "movable" and "fixed." As the name suggests, fixed objects are permanently located at a specific location within the segment, once they are allocated. Movable objects, on the other hand, may be relocated within the segment, i.e. by the Windows® Kernel in order to satisfy other allocation requests or to optimize the request.

Figure 2:
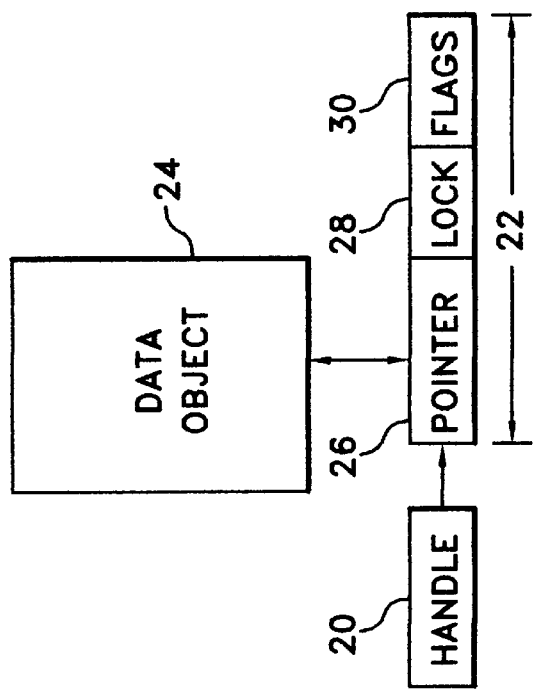
FIG. 2 is a diagram illustrating an exemplary movable data object used by Windows® version 3.1.

The general form of a movable object is shown in FIG. 2. Because they are not fixed to a certain memory location, movable objects are referenced by a "handle" and have two separate parts. The first part 22 is essentially a pointer, and the second part 24 contains the object data. The handle 20 points to the first of the two parts, which is fixed in position within the segment 10 and serves to link the handle 20 to the data via a 16-bit pointer 26. The second part 24, located at the location within the segment specified by the 16-bit pointer, contains the data portion of the object and a back link to the handle portion. In this manner, movable objects may be relocated by (a) relocating the data portion 24 and (b) updating the pointer 26 linking the handle 20 to the data.

It should be noted that a movable object should not be moved when a program is accessing it. Accordingly, the first portion 22 of a movable object contains, in addition to the pointer, a "lock count" 28. When a program begins to access a movable object, it will first increment the lock count 28. A lock count 28 greater than zero indicates to the operating environment that access is in progress and that the object should not be moved. When the program is finished manipulating the object, the lock count 28 will be decremented. The first portion 22 of a movable object also includes a field for boolean flags 30, which are not relevant in the invention.

Even when a movable object is moved, it remains in its original 64K segment 10 (FIG. 1). Therefore, there is a limit to what the operating environment can do to alleviate resource shortages. The invention works with the Windows® GDI to alleviate potential resource shortages within the GDI Object segment.

Figure 3:
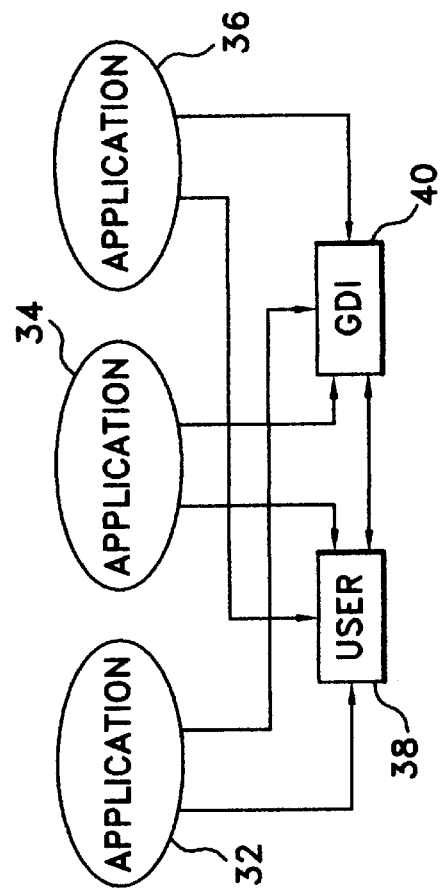
FIG. 3 is a block diagram illustrating the relationship among application programs, the USER module, and the GDI module.

As previously noted, the Windows® 3.1 GDI creates and destroys objects within the GDI Object segment 10 on behalf of application programs and the Windows® USER module. FIG. 3 illustrates the relationship among exemplary applications 32, 34, and 36, the USER module 38, and the GDI module 40. As shown, the GDI module 40 is the lowest-level portion of the system, and can act on behalf of all higher-level programs. Accordingly, a given GDI object can belong to any task, or it can belong to the USER module 38. As discussed above, most GDI objects must remain accessible globally to all tasks.

Figure 6A:
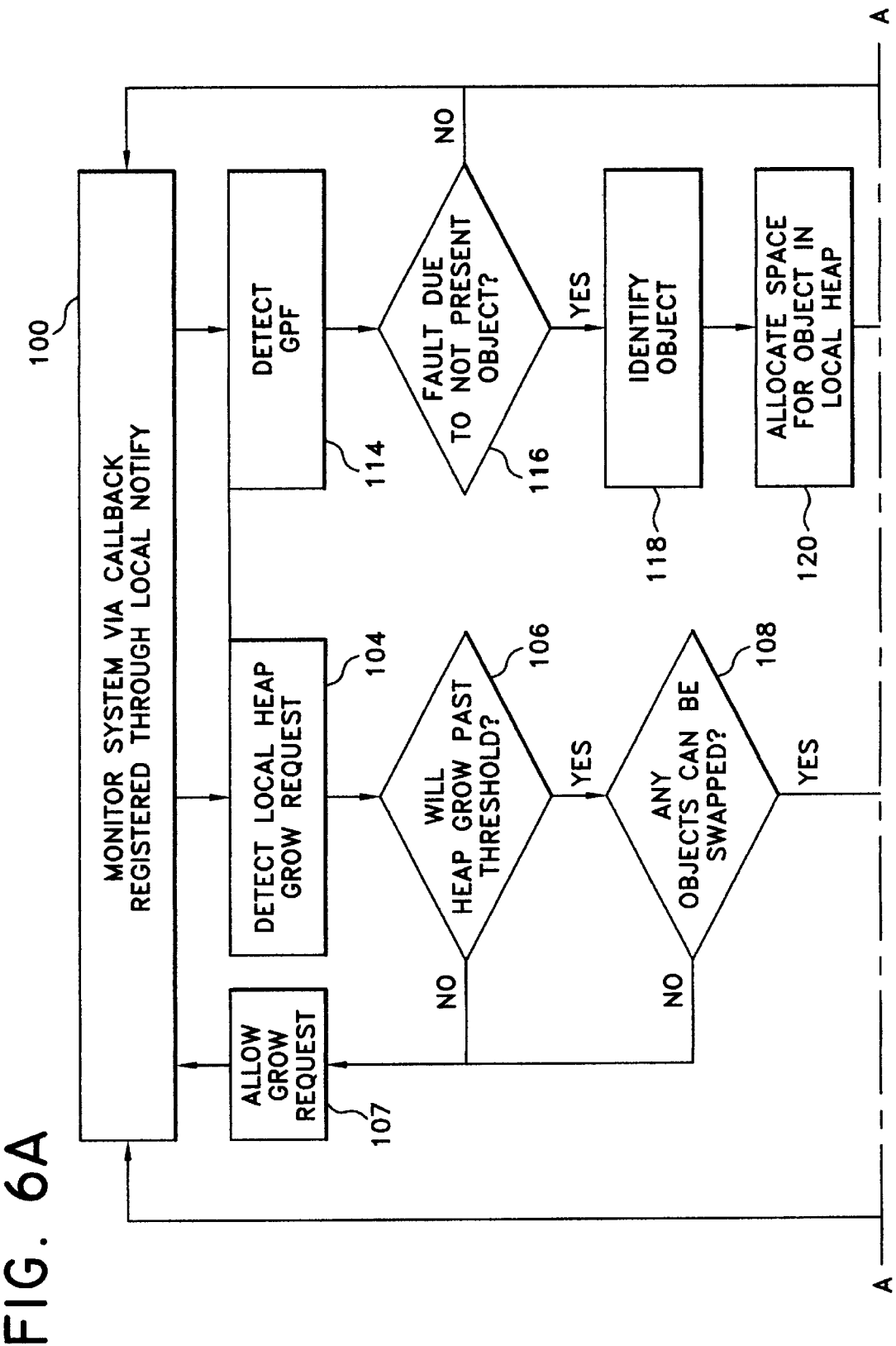
FIGS. 6A and 6B show a flow chart illustrating the steps performed according to an exemplary embodiment of the invention, and which corresponds to the schematic representation in FIG. 3.
Figure 6B:
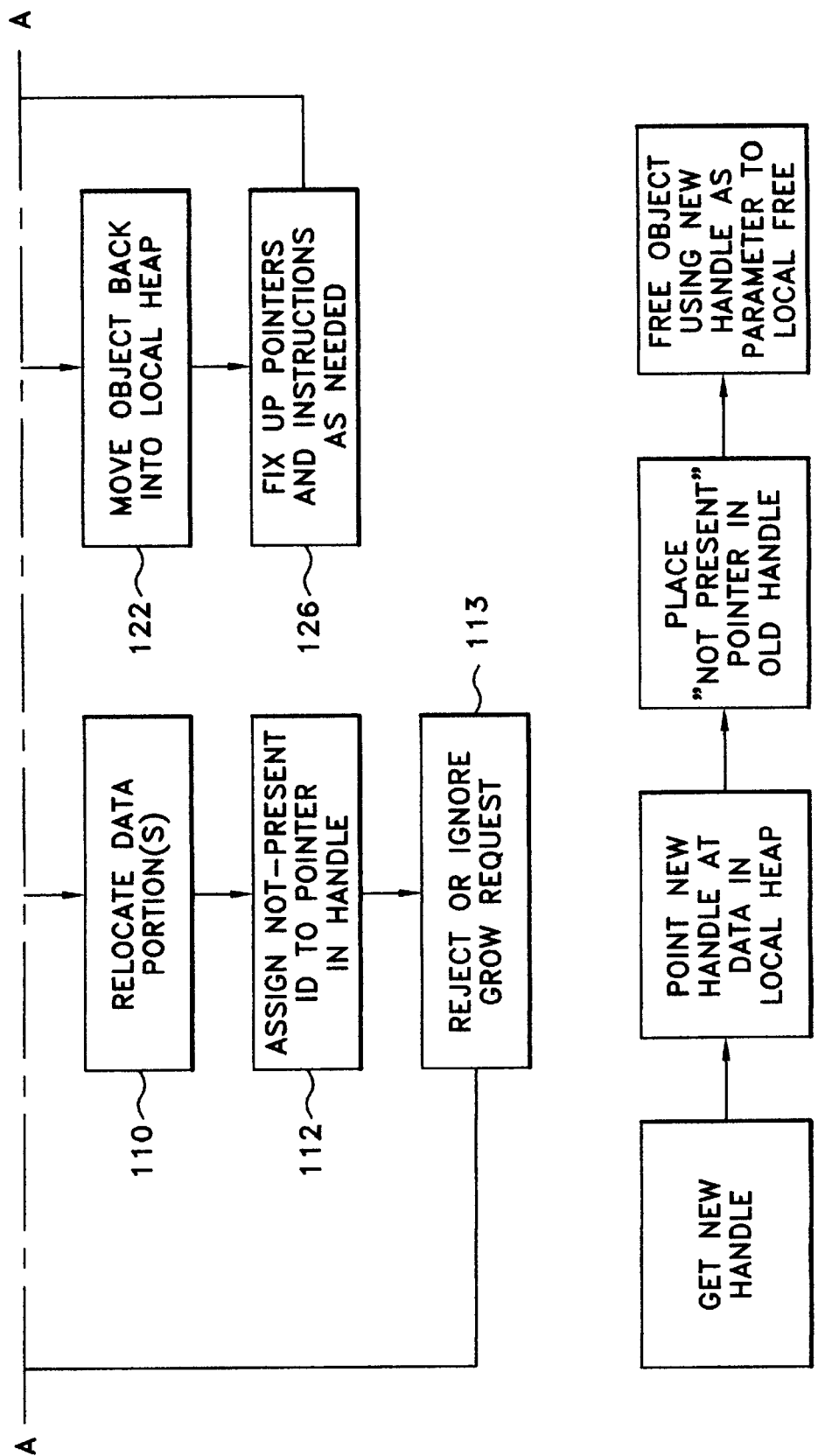

Referring now to the flowchart of FIGS. 6A and 6B, which illustrates the steps undertaken herein, the local heap 12 within the GDI Object segment 10 (following the first 3K of static data 14) is monitored by a callback (step 100). For reasons of efficiency, the local heap 12 is maintained by the KERNEL to be only slightly larger than the sum of the data it contains. Thus, as discussed above, when a program makes an allocation request of the local heap 12 that exceeds the remaining free space, the KERNEL will attempt to move the segment limit 18 and "grow" the local heap by invoking a procedure, e.g. a KERNEL procedure, which is registered through the LocalNotify call in the Windows® Application Program Interface (API). This procedure call is intercepted by the invention to monitor the size of the GDI local heap (step 102). The size of the heap determines what is done by the invention (step 104).

In a preferred embodiment of the invention, no additional action is taken as long as the GDI local heap size is below a threshold, e.g. 80% of its maximum size. Consequently, system performance remains unimpaired when there is no resource shortage. When the threshold is crossed, however, the invention will commence swapping out certain objects and will ignore or reject the request to expand the heap if sufficient objects can be swapped (step 113).

In rejecting the expansion request, the invention examines the contents of the GDI local heap 12 to identify objects that can be combined to exceed the size requested for expansion (step 108). The invention, in identifying such objects, can also consider the lock count for the objects, their likelihood of imminent reuse as suggested by the identity of the process owning the objects, and a least-recently-used determination which can optionally be made by the invention. The ideal candidate for swapping has a lock count of zero (i.e. is not presently being accessed by any application), is not likely to be used soon, has not been used recently, and belongs to a non-executing process.

After sufficient swapping candidates have been identified, the invention copies the data (second) portion 24 of each identified object to a separate 32-bit memory space 16 under the control of the invention (step 110). This space 16 generally is not restricted by the 64K segment limitation imposed on the Windows® GDI Object segment 10. The data portion 24 of each identified object is then released to become free space in the GDI local heap 12. However, the pointer (first) portion 22 of the each identified object is preserved and modified to indicate that the data portion is not present (step 112). This procedure cannot be accomplished by normal documented Windows® procedures; the invention must free the data portion by accessing directly the local heap control structures. One way to accomplish this is to allocate an unused moveable handle, by obtaining it from the local heap control structure. The object is then unlinked from its original handle and is linked to the new handle by modifying the handle structures for the object. The data portion of the object can then be freed, by passing the new handle to the LocalFree call; the original handle remains allocated.

As discussed above, the first portion 22 of a movable object is four bytes long. The first two bytes are a 16-bit pointer 26 to the second portion of the object. After copying the second portion of an object, the invention modifies the pointer 26 to ensure that attempts by the GDI module to access the object will be intercepted by the invention.

As indicated, the GDI Object segment 10 is allocated as a global memory object. As such, it is referenced by programs residing outside of the segment by way of a Local Descriptor Table (LDT) selector. The Windows® KERNEL initializes this selector with a base address representing the beginning of the GDI Object segment 10 and with a limit equal to the size of the segment, accounting for the data contained therein. Any attempt to access the portion of the 64K segment beyond the segment limit 18 using the initialized selector will result in a General Protection Fault (GPF) being issued by the microprocessor.

Accordingly, the invention contemplates that for data objects relocated from the GDI Object segment 10 ("not present objects"), the first (pointer) part 22 of the object will be modified to cause an access beyond the segment limit 18, as discussed above. Every time an attempt is made to access a not present object, a GPF will occur, allowing the invention to intervene (step 114).

In a preferred embodiment of the invention, the maximum size of the GDI Object segment 10 is reduced somewhat, from the 64K segment boundary to, for example, approximately 63K. Attempting to access any hexadecimal addresses within the portion of the segment from 0XFC00 (63K) to 0xFFFF (64K–1) will then result in a GPF. These 16-bit numbers can then be used in the pointer part 22 of the object to uniquely identify 1,024 (or more, if the segment limit 18 is lowered further) not present objects. It is contemplated that the not present object identifiers will be assigned starting at approximately 0xFF00 and moving downward until the segment limit 18 is reached.

When a GPF is intercepted by the invention, it must first be determined if the fault was caused by an attempted access to a not present object or for some other reason (step 116). If the fault was not caused by an attempted access to a not present object, the ordinary course of action taken by Windows® will be allowed to proceed. If the fault was so caused, the invention will identify the desired object (step 118), move it back into the GDI Object segment 10 (step 122), and restore the pointer 26 in the first part 22 of the object to specify the new location within the segment 10 (step 124). In doing so, prior to moving the object back into the GDI Object segment, the invention will identify and relocate other objects out of the segment 10, if necessary, to make room for the accessed object (step 120). The portion of the 32 bit memory space 16 formerly holding the swapped object will then be freed.

Any GPF will preserve the offending instruction and microprocessor register contents and pass them to an error handler. The invention utilizes the error handler to determine what caused the GPF.

The error handler inspects the microprocessor instruction that caused the fault to determine: (1) whether the fault was caused by a memory access, and if so, (2) the segment register through which the memory access was made, (3) the base and/or index register specifying the offset portion of the memory access, and (4) the immediate displacement modifying the offset portion of the memory access. Once the error handler has determined that an invalid memory access occurred by way of the GDI local heap selector, the intended result of the instruction is reconstructed.

Every microprocessor instruction accessing memory by way of a selector does so through a combination of three additional components: a base register, an index register, and an immediate (constant) displacement. Any combination of the three can be used, but the combination is specified by the particular microprocessor instruction used. Consequently, by utilizing a lookup table based on the microprocessor instruction operation code ("opcode") or other conventional means, the error handler of the invention can determine what registers were used and what memory location was intended to be accessed.

The invention assumes that accesses to objects within the GDI Object segment will be made, without exception, through loading a base or index register with the address of the beginning of the data portion 24 of the object (i.e. by "dereferencing the handle," or first accessing the pointer 26 in the first part 22 of the object and utilizing that address to access the second part). It is further assumed that accesses to different offsets within the data object 24 will be made by varying a different register, not the one containing the address as determined through dereferencing the handle 20 above. Accordingly, it is assumed that one register contains the unaltered not present object identifier.

The foregoing assumptions are in practice not restrictive. Windows® 3.1 system modules, such as USER 38 and GDI 40, are comprised largely of compiled high-level source code, which tends to be resolved in a standard way, in the manner specified in the assumptions stated above. Further, references to separate fields within a structure like those stored in the GDI Object segment 10 are invariably performed by specifying the field via an immediate displacement, in compliance with the assumptions stated above.

Moreover, most accesses to such structures first must undergo parameter validation. The handle 20 for the desired GDI object is dereferenced, as discussed above. Before the data portion 24 is used substantively, a "signature" is verified at a set position within the data portion 24 of the object. This parameter validation is performed according to the assumptions stated above, and has the result of forcing the invention to bring in the object if it is not present. Any further references to the object will then succeed even if the foregoing assumptions are not subsequently followed.

Through the foregoing process, the error handler has determined the not present identifier. The invention then proceeds to relocate the object back into the GDI Object segment 10, as discussed above. Then the error handler loads the microprocessor register containing the not present identifier with the new pointer 26 to the data portion 24 of the object within the segment. Program flow is caused to return to the instruction causing the GPF, and access to the desired object will complete successfully (step 126).

As seen, the first aspect of the invention requires two primary functions. First, attempts to expand the local heap 12 corresponding to the GDI Object segment 10 are monitored and trapped. GDI objects can be moved out of the segment 10 according to predetermined criteria, as specified above. Second, GPFs are trapped to determine if a not present object is being accessed, and the object is swapped in if necessary. At the same time, other objects can be swapped out or the local heap 12 grown to make room. As a result of this scheme, the capacity of the GDI Object segment 10 is greatly enhanced, with substantially no performance degradation at low levels of resource depletion. Application programs can continue to operate as designed, with no change in functionality.

Resource Cleanup

Referring again to FIG. 3, note that application programs 32, 34, and 36 and the USER module 38 of Windows® 3.1 are all at a higher level than the GDI module 40. Accordingly, GDI resources can be requested and used by applications programs and USER. Although the USER module is always running while Windows® is operational, this is not necessarily true for application programs. Application programs can be invoked and terminated at will. When application programs are terminated, any GDI objects requested by the application are no longer necessary, and should be eliminated from the GDI Object segment.

Preferably, the act of "cleaning up" the GDI Object segment is performed by the application program terminating or no longer needing the resources. However, not all application programs are written carefully so as to track and eliminate all unnecessary GDI objects. Furthermore, a software malfunction can lead to premature termination of an application, rendering it unable to delete its GDI resources.

Unfortunately, Windows® 3.1, by itself, does not track ownership of GDI objects. Consequently, if GDI resources are not properly managed by the applications and programs that request them, they will continue to occupy space until Windows® itself is terminated. As discussed above, several schemes have been proposed to deal with this limitation; however, all known schemes have significant drawbacks.

Figure 4:
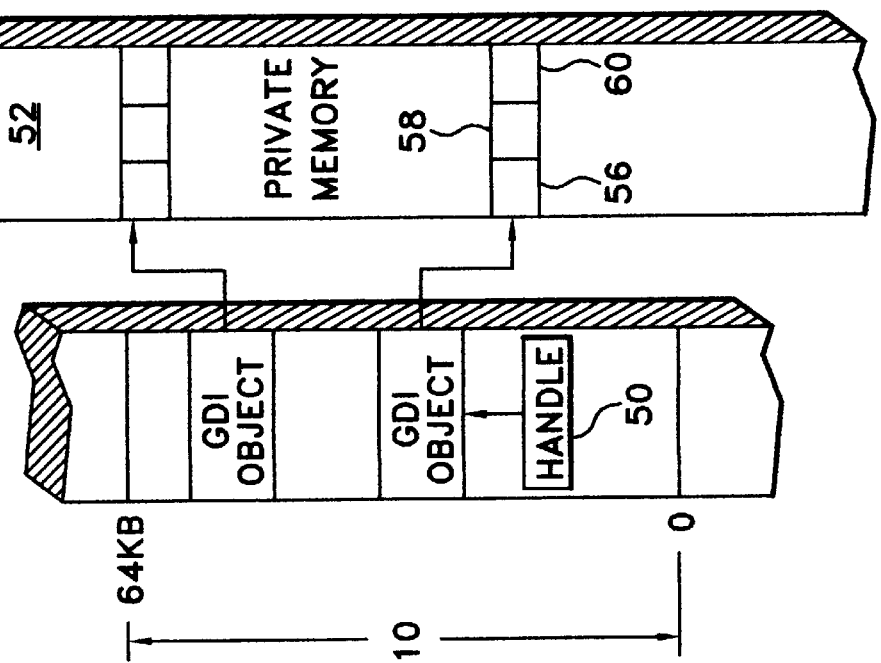
FIG. 4 is a diagram illustrating data structures and operations utilized in a second aspect of the invention regarding the removal of unused GDI resources.
Figure 7A:
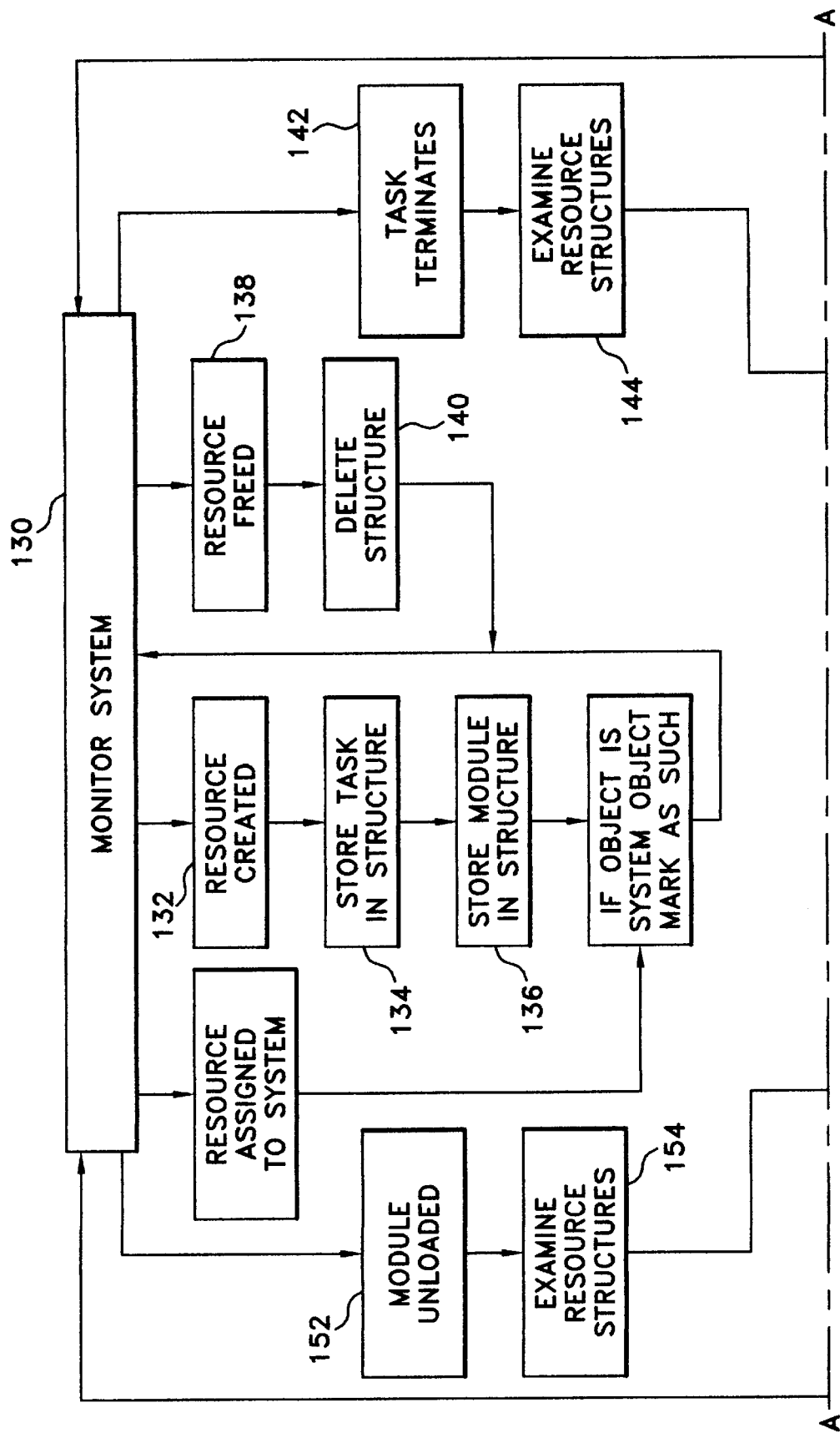
FIGS. 7A and 7B show a flow chart illustrating the steps performed according to an exemplary embodiment of the invention, and which corresponds to the schematic representation in FIG. 4.
Figure 7B:
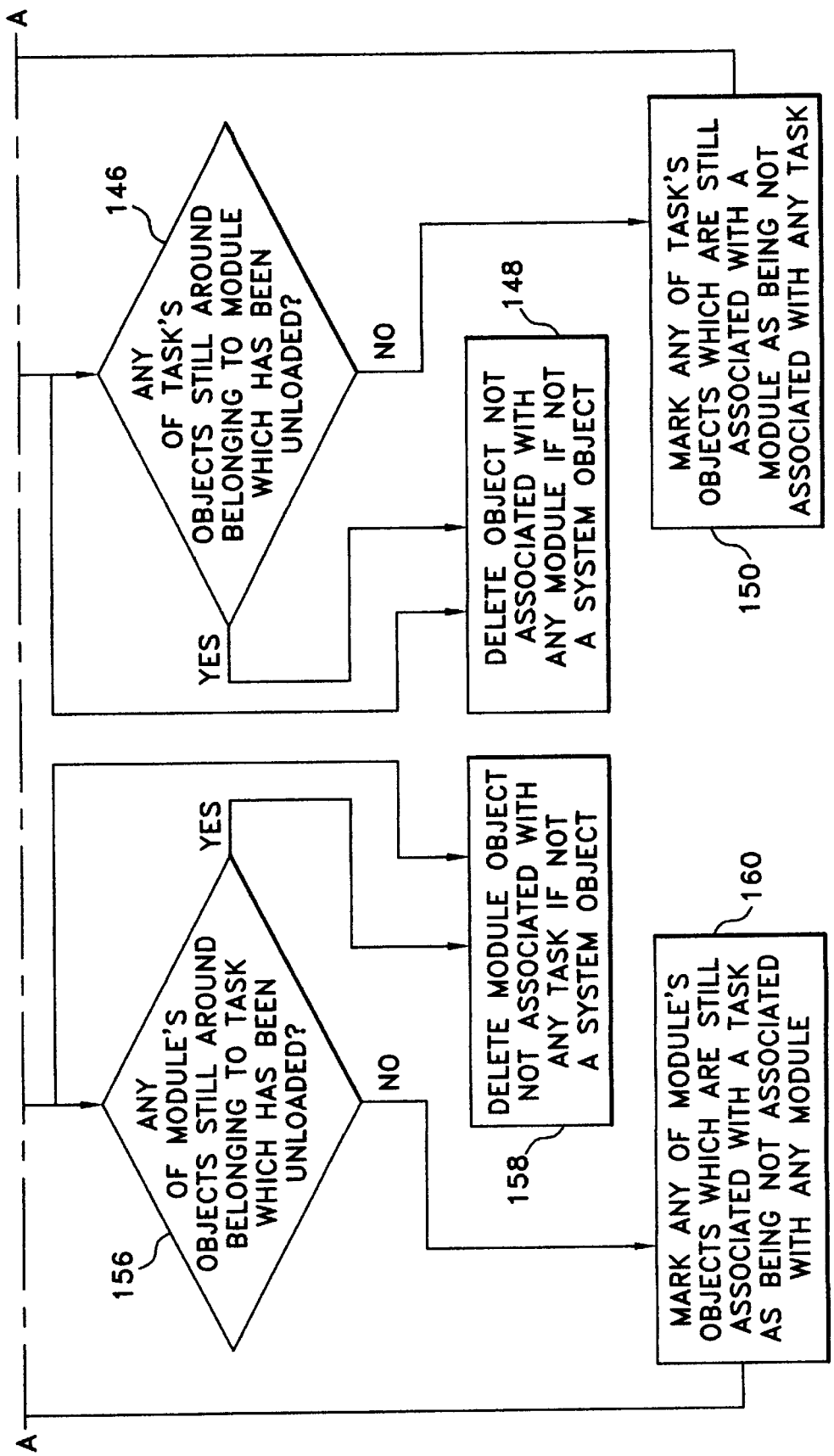
Figure 8A:
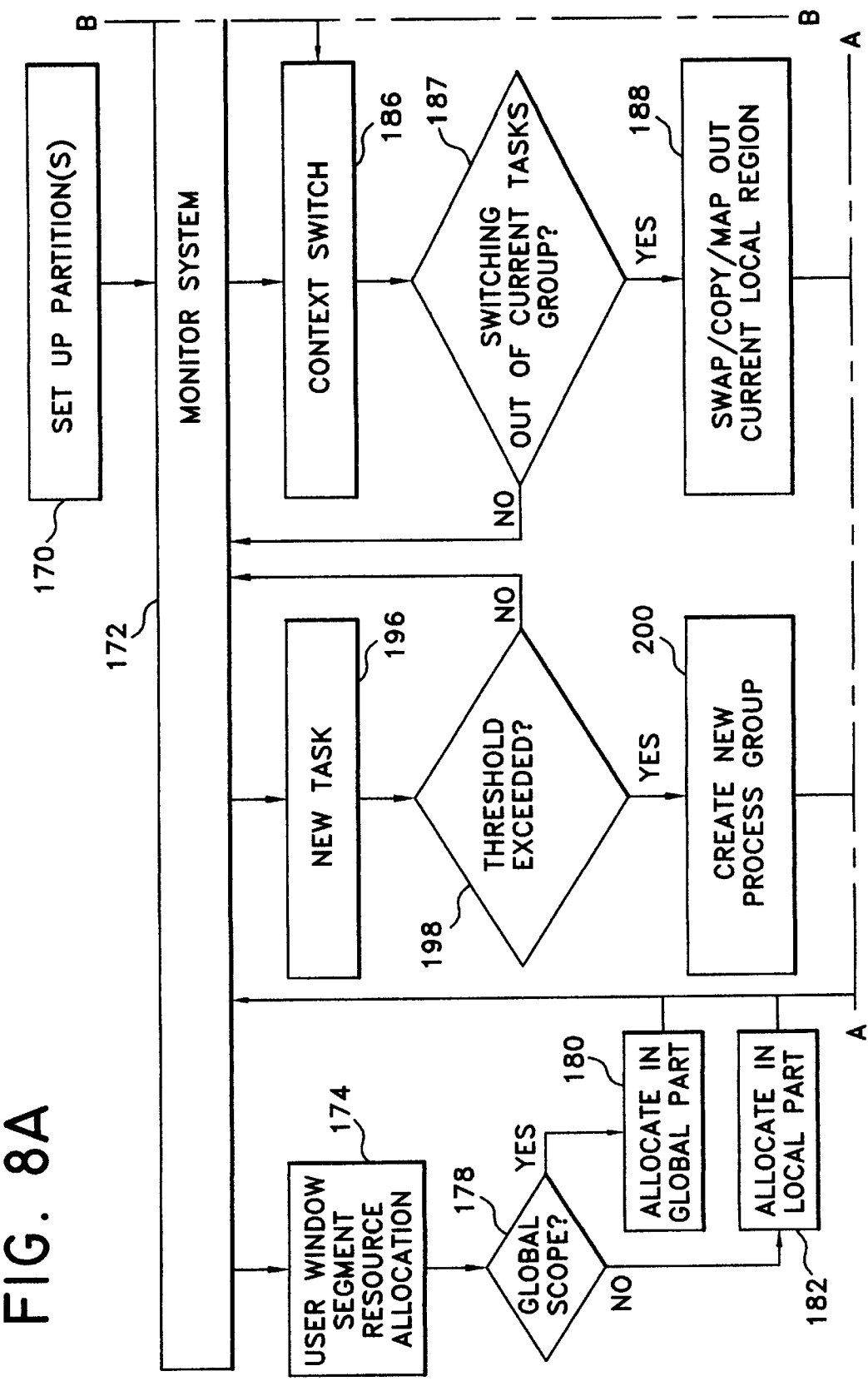
Figure 8B:
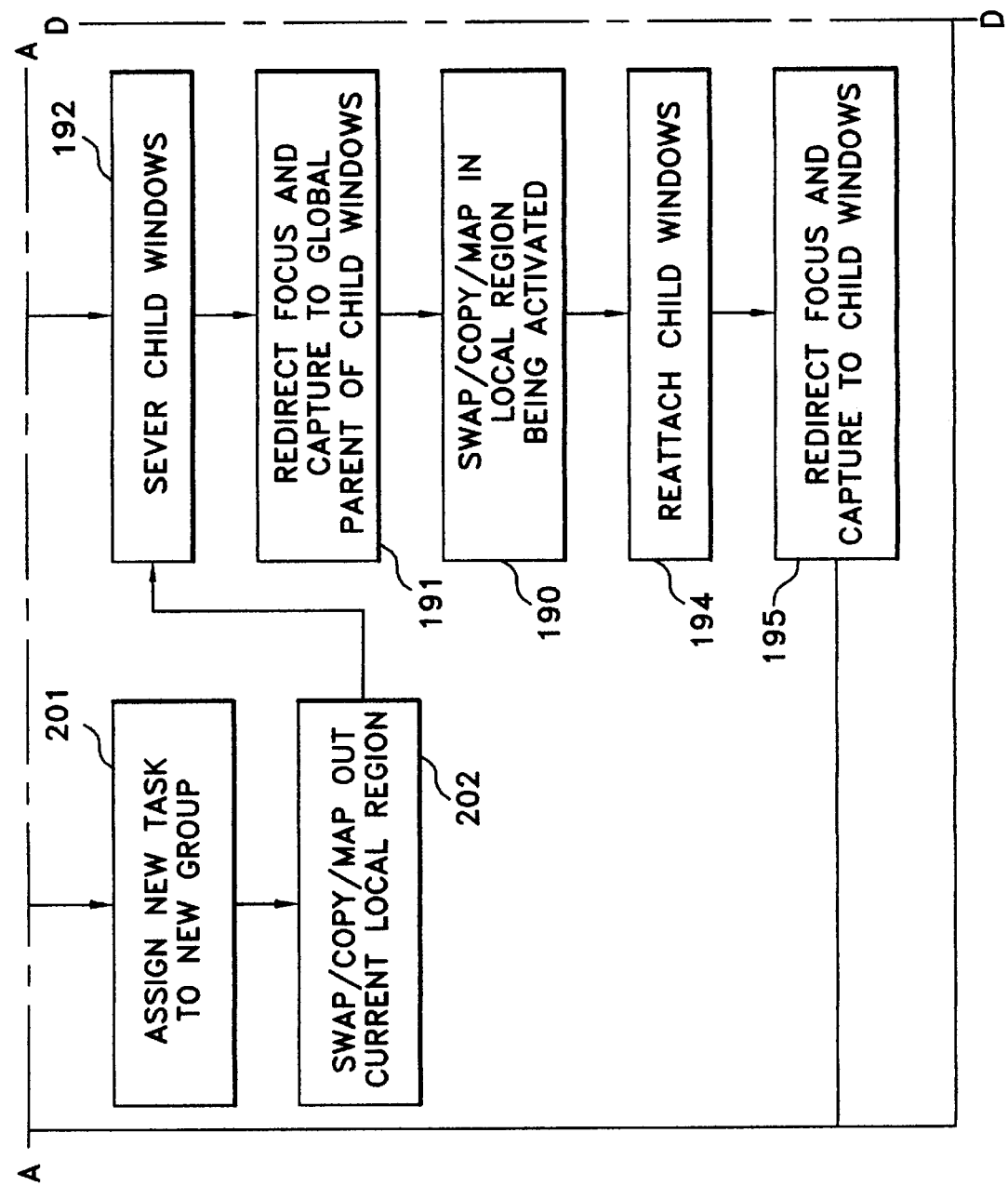
Figure 8C:
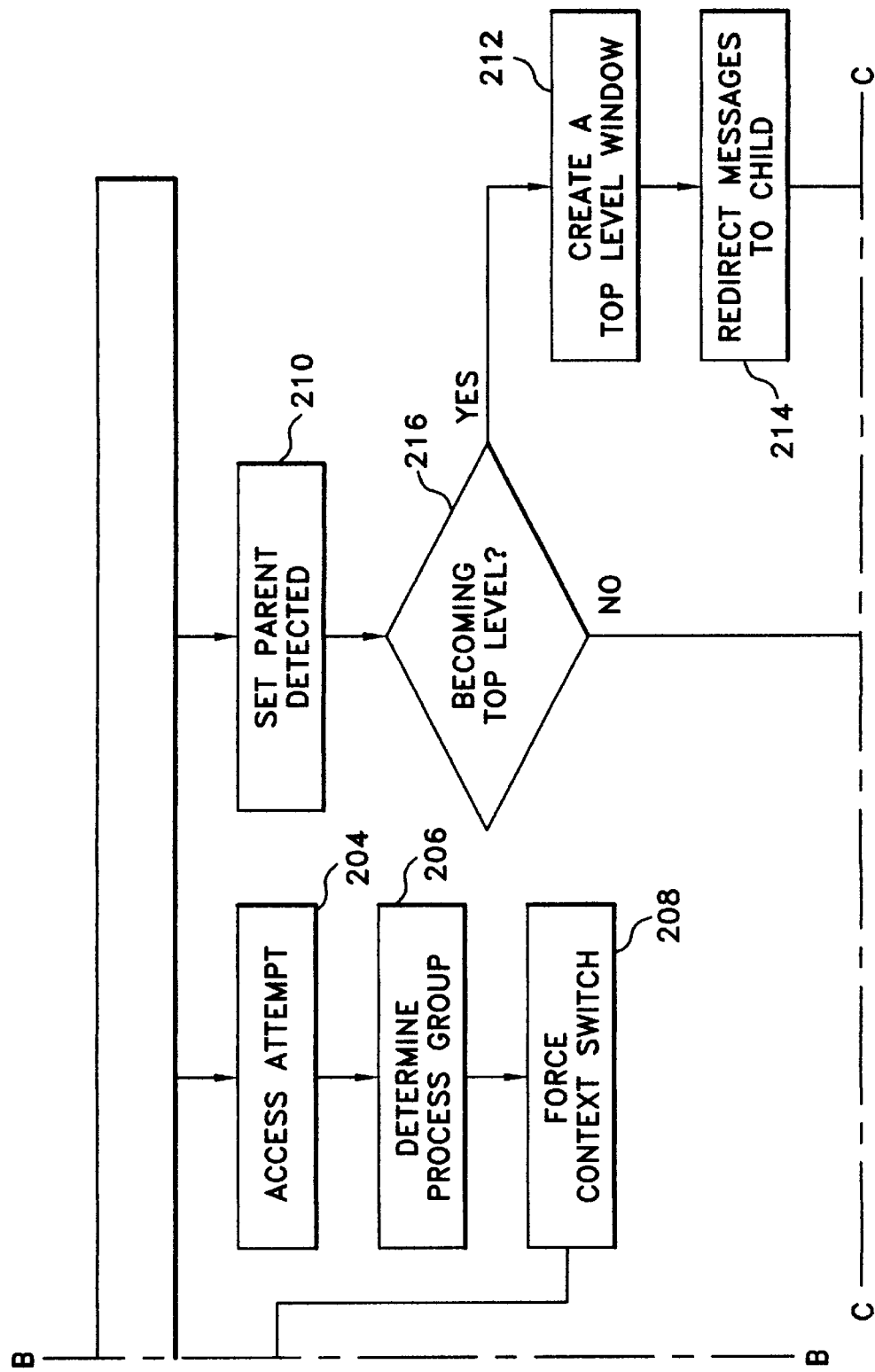

As shown schematically in FIG. 4 and functionally in the flowchart of FIGS. 7A and 7B, the invention eliminates the recognized limitations of the prior art by tracking GDI resource allocation in task and module contexts (step 130). This solves the prior art problem arising from associating resources only with the task that created them, and allows stray objects to be cleaned up directly, when both the task and module have terminated. The invention intercepts all GDI functions that create a resource and return a handle 50 (step 132). At the time each resource is created, the invention stores in a memory area 52 (outside of the GDI Object segment) a structure 54 including information about the object (i.e. a copy of the object's handle) 56, the running task 58 (step 134), and the responsible module 60 (step 136). To determine the module, the segment containing the program code invoking the intercepted GDI function is traced to determine the segment's owning module. The task is determined by traditional means.

The LocalFree function of the KERNEL module is also intercepted by the invention to determine when a resource has been freed (step 138). When this occurs, not only is the resource freed in the GDI Object segment 10 (as is ordinarily done by Windows), but the corresponding structure 54 in the invention's memory area 52 is deleted (step 140).

The invention further intercepts the GdiTaskTermination function of Windows® to determine when a task exits (step 142). At that time, the structures 54 in the memory area 52 are searched (step 144), and any GDI objects allocated by the terminating task and associated with a module that has been unloaded (step 146) are deleted by normal means (step 148). The corresponding structures 54 in the memory area 52 are also deleted. Objects that were allocated by the terminating task but are associated with a module that is still loaded are marked accordingly in their corresponding structures (step 150), so that when the module is unloaded, they will be deleted.

The invention also intercepts the ToolHelpHook message broadcast by KERNEL (step 152). When notification is received that a module is unloading, the structures 54 in the memory area 52 are searched (step 154), and any GDI objects allocated by the unloading module and associated with a terminated task (step 156) are deleted by normal means (step 158). The corresponding structures 54 in the memory area 52 are also deleted. Objects that were allocated by the unloading module but are associated with an existing task are marked accordingly in their corresponding structures (step 160), so that when the task is terminated, they will be deleted.

The invention must not terminate resources that belong to the system. Such objects include certain system clipboard objects. Accordingly, the invention intercepts, for example, the SetClipboardData function to determine if an object is a bitmap or palette object being placed on the system clipboard (steps 162 and 164). Such objects are then marked ineligible for deletion upon termination of the task and module owning the object.

In a preferred embodiment, it is contemplated that the invention will intercept the foregoing functions to ascertain the information needed to efficiently maintain GDI resources. However, it is also contemplated that as an alternative the invention can use callbacks installed using the ToolHelp library to obtain notification of events such as those discussed above.

Accordingly, the invention can track and maintain GDI resource ownership more efficiently and safely than other methods.

User Window Segment

In contrast to the objects stored in the GDI Object segments, objects stored in each of the USER Window segments are fixed. Consequently, the relocation scheme discussed above for GDI objects will not function. Referring once again to FIG. 3, note that USER 38 is the highest-level Windows® module below the application programs 32, 34, and 36. Thus, all objects in the USER data segments, namely the Window segment, are local to an application program or to USER itself. The objects that pertain to a single application are termed local process objects; local process objects include child window descriptors, child window properties, application class descriptors, menu descriptors, and menu titles. The remaining objects are termed global objects. Such global objects do not relate primarily to a single process, but are required to synchronize the windowing interface across all processes; such objects include top-level window descriptors, top-level window properties, system and global class display context ("DCEs") and various transient data objects used by the USER module.

As will be discussed in further detail below, global objects must remain visible to the USER module regardless of which process is executing. However, local objects need not. The invention associates local objects with the task under which they were allocated. If a resource shortage is imminent, the invention is capable of swapping out local objects associated with a task when that task is not running. To decrease overhead, and allow task access to some of the local objects belonging to other tasks, several tasks can be collected as a process group, with all local objects belonging to the group stored together.

A Windows® application typically presents one or more visible or non-visible "windows" to the user. A "window" is an area of the screen that is controlled by a portion of the application known as the "window procedure." Typically, an application consists of a top-level window and multiple child windows that are hierarchically beneath and visibly contained within the screen area assigned to the top-level window. For purposes of the invention, top-level windows are considered to be of global scope, and child windows of local scope, because the top-level window is responsible for a portion of the visible "desktop" area and is required to interact with and may overlap other top-level windows belonging to the same or other processes. The child windows of a top-level window, as they are all contained within the screen area of the top-level window, do not interact directly with the desktop or with other processes.

Window properties affect the characteristics of a particular window, top-level or child. Consequently, they are of the same scope as the window with which they are associated.

A window class specifies a default look and behavior for all windows based on the class. System classes enumerate some common window types useful to all applications. Application global classes are associated with a particular process but are available for use by other processes. Therefore, all of the foregoing classes are considered global for purposes of the invention. Application local classes are available only to the process by which they were created; they are considered of local scope.

As discussed above, a significant portion of the data objects contained in the USER Window segment are of local scope. However, Windows® itself does not distinguish between global and local objects in the USER Window segment. All objects in the segment are equally visible from the standpoint of the USER module, and there is no ordering or partitioning scheme employed to maintain objects of global scope apart from those of local scope.

Figure 5:
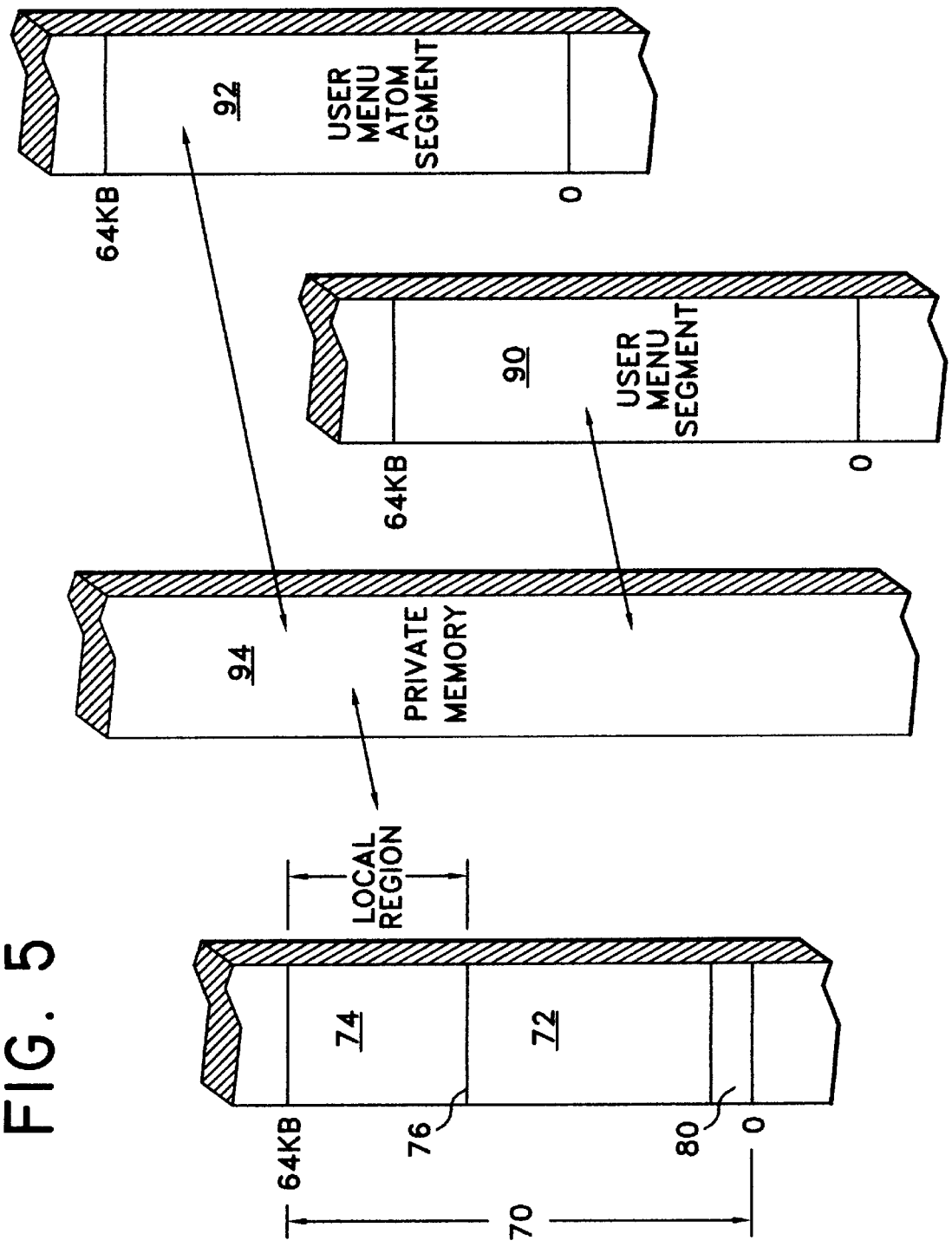
FIG. 5 is a diagram illustrating data structures and operations utilized in a third aspect of the invention regarding swapping local USER resources.

As shown in FIG. 5, the invention improves the availability of resources in a USER Window segment 70 by partitioning the segment into two portions: a global portion 72 and a local portion 74. The local portion 74 can then be swapped in or out of position as different running tasks need different local objects. The global objects remain in place.

Menu & Menu Atom Segments

The partitioning capability of the invention is useful only for the USER Window segment. The remaining two USER segments that contribute to resource scarcity, the Menu segment and the Menu Atom segment, consist entirely of data of local scope. The entire contents of these segments can be swapped. However, as seen below, these segments can benefit from certain aspects of the invention as compared to the prior art.

The invention provides that the local resources of two or more processes can be grouped together. This has two primary benefits: it reduces overhead, and it facilitates sharing resources between applications.

For the operation of this aspect of the invention, refer to the flowchart of FIGS. 8A–8D which shows the steps described herein. The invention first partitions the USER Window segment 70 to maintain data of local scope apart from that of global scope (step 170). To accomplish this, since the objects present in the USER Window segment are all fixed objects, at least one partition location 76 should be established before any allocations are made. In a preferred embodiment of the invention, a fixed page-granular partition size is maintained. As will be discussed below, the page-granularity permits the hardware page mapping features of 80386 and higher microprocessors to be used to effectuate fast swapping. Alternatively, it is contemplated that an adjustable partition can be utilized by allocating global objects at one end of the segment (e.g. from the top down) and local objects at the other end (e.g. from the bottom up).

In the preferred embodiment, the partition 76 is created by growing the USER Window segment local heap 78 to its maximum size, approximately 64K. As in the GDI Object segment 10, the USER local heap 78 is preceded by approximately 3K of static data 80 in Windows® 3.1, leaving 61K available. The invention calculates an appropriate location within the segment for the fixed barrier 76, and implements the barrier 76 by modifying the control structures of the local heap to provide for a "free list" that is linked through the fixed barrier 76 and may be toggled to force allocations to occur from the address space below the barrier 76 or above it. Alternatively, it is contemplated that the invention could use relocation techniques (e.g. of objects after they have been allocated) or other methods to provide for emulated partitioning. The portion of the USER Window segment 70 reserved for objects of local scope is termed the local window heap 74; the portion for objects of global scope is termed the global window heap 72.

After the partition is established, the invention monitors the system and awaits further activity (step 172). When an object is being allocated (step 174) in the USER Window segment 70 (step 176), the invention must determine whether it is of local or global scope (step 178). The various types of global and local objects are discussed above. However, in one embodiment of the invention, only child windows are considered to be local. All other object types can remain on the global side 72 of the partition 76 with little possibility of resource depletion. To determine whether an object being allocated is a child window, the LocalAlloc and CreateWindow functions are intercepted by the invention, and the parameters passed to these functions are analyzed. Child window property objects can be detected by intercepting the SetProp function. Application local class objects can be detected by intercepting the RegisterClass and RegisterClassEx functions. In any event, the scope of the intended allocation is determined by the invention and space on either side of the partition 76 is allocated accordingly (steps 180 and 182).

As discussed above, it is not necessary to partition the USER Menu segment 90 and Menu Atom segment 92; all data contained therein is of local scope (see steps 174, 176, and 184). However, such segments are still candidates for the swapping scheme contemplated by this aspect of the invention. Thus, it is provided that each running process or process group will have its own local portion of the USER Window segment 70 and its own Menu 90 and Menu Atom 92 segments. The invention handles swapping to ensure that the proper segments are in place when the appropriate process is executing; all swapped-out data is maintained in a memory area 94 private to the invention.

The invention monitors the KERNEL to determine when a context switch is performed, i.e. a different process begins to run (step 186). Several callbacks exist to monitor these events, both in the ToolHelp library and in KERNEL itself, such as RegisterNotify and ToolHelpHook. When the invention is informed of a process switch, it will copy out the data corresponding to the outgoing process (step 188) and copy in the data corresponding to the incoming process (step 190). For performance reasons, it is contemplated that the invention will use hardware page mapping features of the microprocessor to implement the data swapping. However, other techniques known in the art, such as reprogramming the LDT selectors to modify the starting address of the heap, can accomplish the same result. Note that hardware page mapping can only be performed on intervals of 4K. Consequently, if the swapping is to be implemented in that manner, the beginning and end of each swapped local segment must be on a 4K boundary. The invention can accomplish this 4K alignment through the use of DPMI services.

When the local portion 74 of the USER Window segment 70 is swapped out, child windows will be dissociated from their parent top-level windows. Consequently, it is necessary for the invention to sever the child window data structures from the top-level window data structures when a swap-out is undertaken (step 192), and to reattach the child windows when the swap-in occurs (step 194). This is necessary to prevent accesses to not-present child windows by way of the top-level windows. This is accomplished by unlinking and relinking the pointers contained in each top-level window structure contained in the global portion of the segment. Additional special action may be required when a child window owns the window focus (i.e. is receiving keyboard or mouse input). In such cases, the focus is redirected temporarily to the top-level window associated with the severed child window (191); the focus is restored when the child window is reattached (195). For purposes of the invention, a child window that is a capture window is treated in the same manner as a child window that has focus.

Pooling Multiple Processes

It is an object of the invention to maintain system performance substantially unimpaired. Accordingly, the invention further provides the ability to allow multiple processes to share a single local window heap 74 and single Menu 90 and Menu Atom 92 segments. This reduces swapping caused by frequent remapping and reduces space utilization caused by the existence of multiple copies of each segment. If a task switch is made between two tasks in the same process group, no swapping need be done (step 187). At the time a process is created (step 196) or when the invention detects that a USER resource is overfull (step 198), the invention can intervene to assign the new process to a different process group (step 200) and allocating new local heaps. At that time, the old local heaps will be swapped out (step 202) as discussed above.

Because objects in the USER segments are allocated as fixed objects, the handles returned by CreateWindow and CreateMenu functions are direct pointers to the data structures in the appropriate segment. The swapping methodology contemplated by the invention introduces the possibility that more than one resource (for different processes) will share the same pointer value. For several reasons, as discussed below, it is useful to be able to distinguish the process owner of an object based on its handle. Thus, the invention includes means to ensure the uniqueness of all outstanding handles to window and menu objects.

Because local heap objects begin on double-word-aligned boundaries (every 4 bytes), there is a total of 16,384 possible unique handles to a 64K segment. The invention employs two tables reflecting the handles in use in the USER Window and Menu segments. Each slot in the table represents an allocated handle. In order to provide unique handles, the LocalAlloc function of the Windows® KERNEL is intercepted and monitored for allocation requests in the appropriate segments (see steps 174–184). By accessing the control structures of the local heaps or by performing the allocation request itself, the invention can cause the allocation to occur at a position corresponding to an unallocated slot in the table. The appropriate table is then updated to reflect the identity of the allocating process.

The assignment of unique handles, as discussed above, provides a means for the invention to determine if a not-present resource is being accessed. The invention intercepts all Windows® functions having as a parameter a handle to a window or a menu (step 204). It examines these parameters to determine if the desired window or menu belongs to another process or process group (step 206). If so, a context switch is performed as discussed above (step 208) to bring the proper local segments into place, and the function is allowed to continue. The context switch can be performed using the Windows® functions TaskSwitch and DirectedYield, or the context switch can be simulated by only remapping the local segments as discussed above or by accessing directly the unmapped data in the invention's private memory area 94. Alternatively, the intercepted Windows® function can be emulated by the invention to avoid the overhead of a context switch.

Although not disclosed in detail herein, the invention further contemplates additional methods of intercepting attempts to access swapped-out local objects, including handle reassignment and a faulting mechanism on the reassigned handle (similar to the mechanism for the GDI Object segment discussed above). Also, such local objects may be hidden to prevent their visibility to other processes.

Furthermore, the invention recognizes that it may be useful in certain cases to be able to override the default behavior of the methodology discussed above. In particular, the automatic assignment of processes to process groups and the ability to predict the scope of a window before it is allocated might not always be efficient or practical. Consequently, the following features are provided to specify alternative behavior.

Certain application programs may consist of multiple processes sharing a common user interface. Contrary to an assumption made above, the windows and menus used by such application programs may not belong to a single process. Because of this, it is useful to maintain all such processes belonging to a single application in a single process group. As discussed above, the invention dynamically allocates process groups as necessary. However, by specifying the processes that comprise multiprocess applications in an initialization file, the invention can be made to override its default behavior and assign the appropriate processes to a single process group.

Similarly, Microsoft's OLE libraries, version 2.0, allow one application to take over a second application's window frame and menus. A data object of a type originating in the second "embedded" application can thereby be seamlessly edited in place within the first "container" application's window. In order to implement OLE's "In-Place Activation" feature, the applications must be able to share local resources in a manner that is potentially incompatible with the process group-based swapping mechanism discussed above. Accordingly, the invention provides a means for ensuring that the container and embedded applications are always within the same process group.

It is observed that the embedded application is always invoked by the container application with the "-EMBEDDING" command-line switch. By intercepting the WinExec function of the KERNEL and detecting the foregoing condition, the invention is able to associate the two applications in the same process group.

It is further noted that top-level and child windows do not always maintain their top-level and child status. As discussed above, the initial type of a new window is determined by intercepting the CreateWindow and CreateWindowEx functions. Child windows are identified explicitly by their WS_CHILD attribute or implicitly by specifying a window other than the Windows® desktop as their parent.

However, an application can modify a child window to become a top-level window, or vice versa. This is accomplished through the SetParent function and is typically used to implement window controls consisting of an edit box window connected to a drop-down list box. The drop-down list box is a child window of the edit box window until it is activated. It is then made a top-level window through the SetParent function.

This functionality is supported by the invention by allocating an alias window. The SetParent function is intercepted (step 210), and rather than changing the scope of the child window, the invention allocates a new top-level window in the global portion 72 of the USER Window segment 70 (step 212). The SetParent function is then allowed to operate on the new top-level window, and the original child window continues to exist. Any messages (i.e. user interactions) received by the new top-level window are intercepted by the invention and reissued to the original child window (step 214). If the application then issues another SetParent function to re-establish the child window, the invention intercepts that call (steps 210 and 216), destroys the new top-level window (step 218) and returns control to the child window (step 220).

The foregoing method for handling the SetParent function involves a certain amount of overhead. Furthermore, it does not necessarily work with all applications. For that reason, it is desirable to be able to specify on an individual basis (by the name of the window class) in an initialization file any application windows that undergo the foregoing transformation. Such windows can then be allocated in the global section of the USER Window segment and the SetParent function will be able to function unhindered.

By way of the foregoing methods, available system resources in the USER Window, Menu, and Menu Atom segments can be substantially increased with respect to prior art methods.

Process Relocation to Another Group

To ensure maximum usage of the existing process groups it is provided that the invention can relocate existing data objects of a process into a newly allocated process group, whenever the resource usage of the process is detected to cause an overflow of the local portion or to exceed a threshold. This is accomplished by monitoring allocations from the local portion (described above) and detecting when the remaining space in the local portion has decreased below a threshold level or has been exhausted. At that time the data objects of each process using the process group are itemized to determine which process is consuming the most space. A new process group and new local portion are then created and the data objects for the process are moved from their existing locations into identical locations in the new local portion. Any internal tables to which the invention refers in order to determine which process group is associated with a given data object, such as those described herein, are updated accordingly to reflect the new process group.

This process can also take place whenever an embedded application and a container application are to be placed within the same process group. In this event, a new process group is created when the embedded application is about to start, and all local resources for the container application are moved into the new process group in order to maximize the space allotted to the container/embedded group.

Intercepting Windows API Functions

In embodiments of the invention that function in cooperation with Microsoft Windows®, it may be necessary or advantageous to intercept Windows® API functions. Exported functions in the Windows API are called by applications in two ways. The function can be dynamically linked to by the application, or the application can directly address the function called. In the case of a dynamic link, the Windows® loader contained in the KERNEL patches the application code, at the time that the portion of the code containing the Windows® function call is loaded. The patch contains a direct far call to the desired function. The NE executable header of the application program contains the desired module (e.g. USER, GDI, etc.) and the name or ordinal of the function. The KERNEL uses GetProcAddress to determine the address of the function to patch in to the application's code. Alternatively, the application can itself use GetProcAddress to determine the address of the function to be called.

There are no supported methods for intercepting functions in the Windows API. However two prior art techniques exist for doing this. In one method, the code segment containing the function's entry point is modified so that when the function is called, control transfers to the interceptor routine. This method is described in Microsoft Systems Journal, January 1994. If the interceptor routine then desires to pass control back to the original function code, the modified entry point is temporarily restored while the original code executes. Alternatively the functionality of the initial CPU instructions that were patched over are emulated and control transferred to the instruction following the patch.

This approach has a number of drawbacks. The code segment containing the function's entry point must be made nondiscardable because, if the segment is discarded and then reloaded, the function will no longer be intercepted. There is also overhead associated with allocating a read-write alias selector to the code segment in order to modify and restore the entry point. If the functionality of the first instructions at the entry point are emulated then these instructions must be known, and the interceptor must be custom designed for the function being intercepted. In consequence, no other interceptors of the function are allowed. Also disadvantageous is that the entry point of the function must comprise at least five bytes which are sufficient to patch in a jump or far call to the interceptor routine. Finally, converting a segment from discardable to nondiscardable may confuse the program code of the owner of the segment and cause it to malfunction.

In another prior art method, the GetProcAddress function itself can be intercepted in order to return the entry point of the interceptor routine. This method is demonstrated in a limited fashion in Adobe's Type Manager product, which intercepts GetProcAddress calls performed by GDI's CreateDC function. Thus, instead of intercepting the GetProcAddress function generally, Adobe modifies the far call to GetProcAddress contained in CreateDC. In order to intercept a Windows API function systemwide, the GetProcAddress function itself would have to be intercepted, as described, by providing an interceptor routine for GetProcAddress. This interceptor which would have to (1) reissue the GetProcAddress function to determine the original unmodified entry point of the function desired, (2) compare this entry point against a list of entry points to functions that are intercepted, and (3) possibly return the intercepted entry point instead of the original entry point. For this reason the code segments of the original entry points would have to be made nondiscardable, with the disadvantages previously described.

The invention contemplates intercepting a large number of functions in the Windows® API. For this reason and because it is desirable to minimize the overhead and impact of intercepting such a large number of functions, the prior art solutions are insufficient. In contrast to the prior art techniques, the invention modifies the module header for each module containing functions that are to be intercepted, in such a manner that the entry point of the function as determined by GetProcAddress is able to be changed.

Note that the GetProcAddress function is used to resolve all function entry points. In order to resolve each entry point, GetProcAddress accesses the module header maintained by the KERNEL of the module containing the function, and in particular the entry and segment tables contained in the module header. See, Schulman et al., Undocumented Windows, chapter 5 (1992). Exported functions are grouped in the entry table into bundles where each bundle represents a consecutive list of functions by ordinal. Each function is identified by an entry containing four fields, (a) byte type flag, (b) byte other flags, (c) byte segment number, (d) word offset of function entry point in segment. The byte segment number refers to the segment table also contained in the module header which is used to obtain the selector of the segment if it is loaded, or the file position of the segment's image if it is not. A word field at offset 1Ch in the module header contains the number of segments in the segment table, and another word field at offset 22h indicates the starting offset of the segment table in the module header.

Because all exported functions must be located within one of the segments in the segment table, the present invention creates one or more additional entries in the segment table representing one or more code segment components of the invention. In order to do this the module header itself may have to be expanded in order to create space for the additional entry in the segment table. Therefore the invention reallocates the segment containing the module header to be larger by the size of the original segment table, plus the space required by the additional entries to be added to the table. The original segment table is then relocated to its new position and the starting offset pointer is modified accordingly. The additional segment entries are added by copying the appropriate entries from the invention's own segment table to the target new segment table entries. Each such segment added should be preloaded and nondiscardable as the Windows® loader will not be able to load the segment based on this information in the target module header. At this point the invention has obtained one or more byte segment indexes representing the segments that have been added.

In order to intercept any of the functions in the target module, the invention modifies the function entry structure described above to indicate one of the new segment indexes, and an offset in the segment. In this way, GetProcAddress performed by the Windows® dynamic linker, or by an application program, will obtain the address of the desired interceptor routine. The interceptor routine may pass control to the original function entry point that was obtained before the modification described above.

In view of the above explanation of the exemplary system, it will be appreciated that embodiments of the invention may be employed in many different applications to manage scarce system resources. While certain exemplary structures and operations have been described herein, the appropriate scope hereof is deemed to be in accordance with the claims as set forth below.

What is claimed is:

1. A method for intercepting access by a program to 16 bit exportable functions associated with a function module, comprising the steps of:

obtaining the address of a module header for a function module, wherein the header includes pointers identifying entry points of the exportable functions in said function module and at least one segment table identifying contents of the function module;

adding to the segment table one or more segment entries corresponding to segments of an interceptor module containing an interceptor routine wherein each segment containing an interceptor routine is made nondiscardable; and modifying the module header so that an attempt to determine the entry point of an exportable function in the function module returns a pointer to an entry point of the interceptor routine.

2. The method of claim 1, wherein the module header is stored in a segment of the function module, and the step of adding to the segment table comprises the steps of:

allocating the segment in the function module containing the module header to a size sufficient to contain the module header, the segment table, and at least one additional segment entry;

relocating the segment table to the allocated portion of the module header;

updating entry point pointers contained in the module header to identify the location of the relocated segment table;

adding to the segment table at least one additional segment entry corresponding to segments of the interceptor routine; and updating a value in the module header containing the number of segments in the segment table.

3. The method of claim 1, further comprising the step of, for each exportable function to be intercepted, changing the pointer to the entry point of the exportable function in an export table of the module header to indicate the entry point of the interceptor routine contained in the added segment entries.

4. The method of claim 3, wherein each pointer to an entry point comprises:

a segment index value identifying a particular segment in the module and a segment offset value indicating a location in the particular segment, and wherein the step of changing the pointer comprises the step of setting the segment index value to a segment index value identifying one of the additional segment entries and setting the segment offset value to an offset of the interceptor routine in the identified additional segment entry.

5. A method of redirecting an API function call by a program to an alternative intercept function, comprising the steps of:

identifying a function module for the API function, the module having an entry table containing at least one pointer that indicates an entry point for the API function, the module further containing a plurality of segments and a segment table identifying each segment in the function module, each API function being located in one of the segments;

selecting a pointer from the entry table that indicates an entry point for the API function;

changing the selected pointer to indicate the entry point for the intercept function;

adding at least one additional entry to the segment table representing a segment containing the intercept function, wherein each additional entry added to the segment table is preloaded and set as nondiscardable.

6. The method of claim 5, further comprising processing a request to provide the program with an entry point for the API function, and returning a pointer to the entry point for the intercept function.

7. The method of claim 5, wherein the function module has a header, and the entry table and segment table are in the header.

8. The method of claim 5, wherein at least part of the intercept function is contained in an intercept module having a corresponding segment table and the adding step comprises copying at least one entry from the segment table in the intercept module to the segment table in the function module.

9. The method of claim 7, further comprising the step of increasing the size of the header to make room for the at least one additional entry in the segment table.

* * * * *